United States Patent
Cho

(10) Patent No.: US 7,280,596 B2
(45) Date of Patent: Oct. 9, 2007

(54) APPARATUS DETECTING MOTION OF IMAGE DATA AND DETECTING METHOD THEREOF

(75) Inventor: Jae-soo Cho, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 902 days.

(21) Appl. No.: 10/355,292

(22) Filed: Jan. 31, 2003

(65) Prior Publication Data

US 2003/0151062 A1 Aug. 14, 2003

(30) Foreign Application Priority Data

Feb. 5, 2002 (KR) ................. 2002-6572

(51) Int. Cl.
*H04N 7/12* (2006.01)
*H04N 11/02* (2006.01)
*H04N 11/04* (2006.01)
*H04B 1/66* (2006.01)

(52) U.S. Cl. ................. 375/240.12
(58) Field of Classification Search ............. None
See application file for complete search history.

(56) References Cited

U.S. PATENT DOCUMENTS 6,313,863 B1 * 11/2001 Chida ............ 348/14.01
6,567,560 B2 * 5/2003 Kadono ............ 382/243
6,618,507 B1 * 9/2003 Divakaran et al. ....... 382/236

FOREIGN PATENT DOCUMENTS

| EP | 1 021 042 | 7/2000 |
|---|---|---|
| EP | 1 065 877 | 1/2001 |
| JP | 10-23393 | 1/1998 |
| JP | 2000-209570 | 7/2000 |

OTHER PUBLICATIONS

Japanese Office Action issued by the Japanese Patent Office on Aug. 30, 2005 in the Japanese Patent Application No. 2003-18704 filed on Jan. 28, 2003 and related to the present above-identified pending US patent application, 2 pages.
Jones, Bernard J.T., "Low-Cost Outdoor Video Motion and Non-Motion Detection," *Security Technology*, Oct. 18, 1995, pp. 376-381.
Feng, Jian, et al. "Scene Change Detection Algorithm for MPEG Video Sequence," *Proceedings Of The International Conference On Image Processing* (ICIP), vol. 1, Sep. 16, 1996, pp. 821-824.

* cited by examiner

*Primary Examiner*—Nhon Diep
(74) *Attorney, Agent, or Firm*—Staas & Halsey LLP

(57) ABSTRACT

An apparatus detecting motion in image data by compressing and encoding and a method thereof. The motion detecting apparatus has a separation unit, an operation unit and a comparison unit. The separation unit separates a bit stream in relation to a motion predicted image from a compressed encoded image bit stream. The operation unit calculates an average value of the bit stream in relation to the motion predicted image separated at the separation unit. The comparison unit detects a motion when the average value is greater than a predetermined threshold after comparing the average value and the threshold. Thus, because a motion in an input image can be detected by using a compressed encoded image bit stream, a separate circuit or input image processing is not required to detect the motion and adverse affects of camera noise on the detection results can be reduced.

15 Claims, 8 Drawing Sheets

APPARATUS DETECTING MOTION OF IMAGE DATA AND DETECTING METHOD THEREOF

CROSS-REFERENCE TO RELATED APPLICATIONS

This application claims the benefit of Korean Application No. 2002-6572 filed Feb. 5, 2002, in the Korean Intellectual Property Office, the disclosure of which is incorporated herein by reference.

BACKGROUND OF THE INVENTION

1. Field of the Invention

The present invention relates to an apparatus detecting motion in an input video frame (i.e., a single image in a sequence of images) and a detecting method thereof, and more particularly, to an apparatus detecting motion of image data by using a compressed encoded bit stream and a detecting method thereof.

2. Description of the Related Art

The demand for an automatic monitoring system has been recently increased, and a network image monitoring system using a computer or Internet is being developed. Following the trend of the time, digitalization of the existing analog monitoring systems is also being actively developed. The digital monitoring systems can prevent stored images from being damaged. Moreover, a network digital image monitoring system allows easy search and process of a desired digital data, and has various usages and advantages due to easy monitoring using the network.

The amount of image data input into the digital monitoring system can be very vast/large. Therefore, an image compression technology is required to transmit or store the data. For the image compression technology, mainly overlapping elements in an area or a time domain are removed. Besides compressing the image data, a method of transmitting an image data in which a motion is detected to a distant operator, a PDA set up in advance, or an IMT terminal or a method of storing the image into an FTP server is used. When the above methods are applied, the monitoring system can be effectively operated without unnecessarily loading the system because of the large amount of data. Furthermore, when only the image having a motion is stored into a hard disk, in case of a Digital Video Recorder (DVR), the efficiency of the hard disk can be improved. Thus, when the DVR product or the network monitoring system involves a function of motion detection, the efficiency of the product is improved and the added value of the product is also increased.

As a conventional method of detecting the motion from the input image, a method of detecting the motion based on a pixel value of a difference image gained/calculated by obtaining the difference between a previous image and a current image is used. In other words, a statistic featuring value, such as an average and a standard deviation, is derived from the pixel value gained from the difference image, and the statistic featuring value is compared with a threshold gained through an experiment so that the motion can be detected from the image.

FIG. 1 is a block diagram showing a conventional apparatus for detecting motion in an input image using the difference image technique, and FIG. 2 is a flow chart showing a method of detecting the motion using the detecting apparatus shown in FIG. 1. As shown in FIG. 1, the conventional motion detecting apparatus comprises an A/D conversion unit 10, a filtering unit 20, a memory 30, an operation unit 40, a comparison unit 50 and a warning unit 60. In FIG. 2, the method of detecting the motion in the apparatus having the above structure is as follows. Initially, the A/D conversion unit 10 converts an analog signal of the image, input through a camera, into a digital signal. Noise is removed from the converted digital image data at the noise removing filtering unit 20, and then the noise-free converted digital image data is input into the memory 30 and the operation unit 40. At operations 10 and 20, the memory 30 stores a previously input image (P) and a currently input image (C) to compare the images, and, at operation 30, the operation unit 40 obtains a difference image (D) of the noise free currently input image (C) and the previously input image (P) stored in the memory 30. Moreover, at operation 40, the comparison unit 50 compares the difference image (D) value of each pixel with a threshold (t1) to determine which pixel has a motion, and, at operations 41 and 42, a motion binarization process generates a binarized motion image by converting each pixel to a pixel having the motion or without the motion (i.e., a binarization of the difference image based upon classification of each pixel as a motion pixel or a without-motion pixel based upon the threshold motion classification in operation 40). Then, at operation 50, the operation unit 40 calculates the entire sum ($\Sigma BD$) of the pixels converted to binarized image (BD). At operation 60, the sum ($\Sigma BD$) of the entire pixels of the binarized image (BD) is compared with a predetermined threshold (t2). At operation 60, if the sum ($\Sigma BD$) of the binarized image (BD) is greater than the threshold (t2), it is judged that there has been motion in the currently input image (C) and at operation 70, a motion detection warning is generated from the warning unit 60.

The motion detecting method using the difference image can obtain a great amount of information from each pixel unit, and has an advantage of detecting a motion by using various statistical features of the difference image. However, the operation of the conventional motion detecting method is slow because data is obtained/processed for each pixel unit, and there is a disadvantage that the detected result can be sensitive to/negatively impacted by camera noise or a change of the external environment.

Moreover, the method of detecting the motion in an input image by using the difference image requires extra frame memory to store the previous and current input image data to compare the previously input image and the currently input image. Such a method also requires a noise-removing filter to prevent mis-operation caused by the camera noise. Furthermore, it is difficult to set up the thresholds (t1) and (t2) to judge/detect whether an image has a motion.

SUMMARY OF THE INVENTION

Accordingly, the present invention provides an apparatus detecting motion in image data (i.e., a video frame or an image in a sequence of images) by using a compressed encoded bit stream without an auxiliary circuit or a separate input image processing, and a detecting method thereof.

Additional advantages of the invention will be set forth in part in the description which follows and, in part, will be obvious from the description, or may be learned by practice of the invention.

The present invention can be achieved by providing an apparatus detecting motion in image data comprising a separation unit to separate a bit stream in relation to a motion predicted image from a compressed encoded image bit stream; an operation unit to obtain an average value of the bit stream in relation to the motion predicted image separated at the separation unit; and a comparison unit to compare the average value calculated at the operation unit and a predetermined threshold and to output a motion detecting signal when the average value is greater than the predetermined threshold.

According to an aspect of the present invention, a method of detecting motion in image data comprises separating a bit stream of a motion predicted image from a compressed encoded bit stream; obtaining an average value of the bit stream of the motion predicted image; and detecting motion in the image data when the average value is greater than a predetermined threshold after comparing the average value and the threshold.

According to an aspect of the present invention, a method of detecting motion in image data comprises separating a bit stream of a motion predicted image from a compressed encoded bit stream; obtaining a changing ratio of an average value of the bit stream of the motion predicted image; and detecting motion of the image data when the changing ratio is greater than a predetermined threshold after comparing the changing ratio and the threshold.

According to an aspect of the present invention, the comparison unit detects a motion in image data by comparing a changing ratio of an average value and a predetermined threshold.

BRIEF DESCRIPTION OF THE DRAWINGS

The above-mentioned features of the present invention will be more apparent by describing the preferred embodiments of the present invention by referring to the appended drawings, in which.

DETAILED DESCRIPTION OF THE PREFERRED EMBODIMENTS

Figure 1:
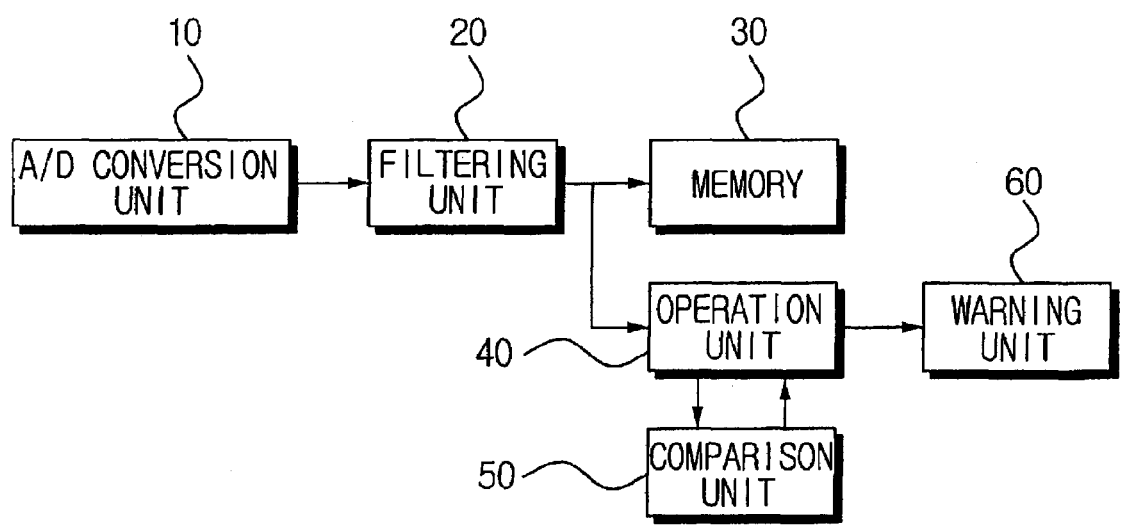
FIG. 1 is a block diagram of a conventional apparatus detecting motion in image data.
Figure 2:
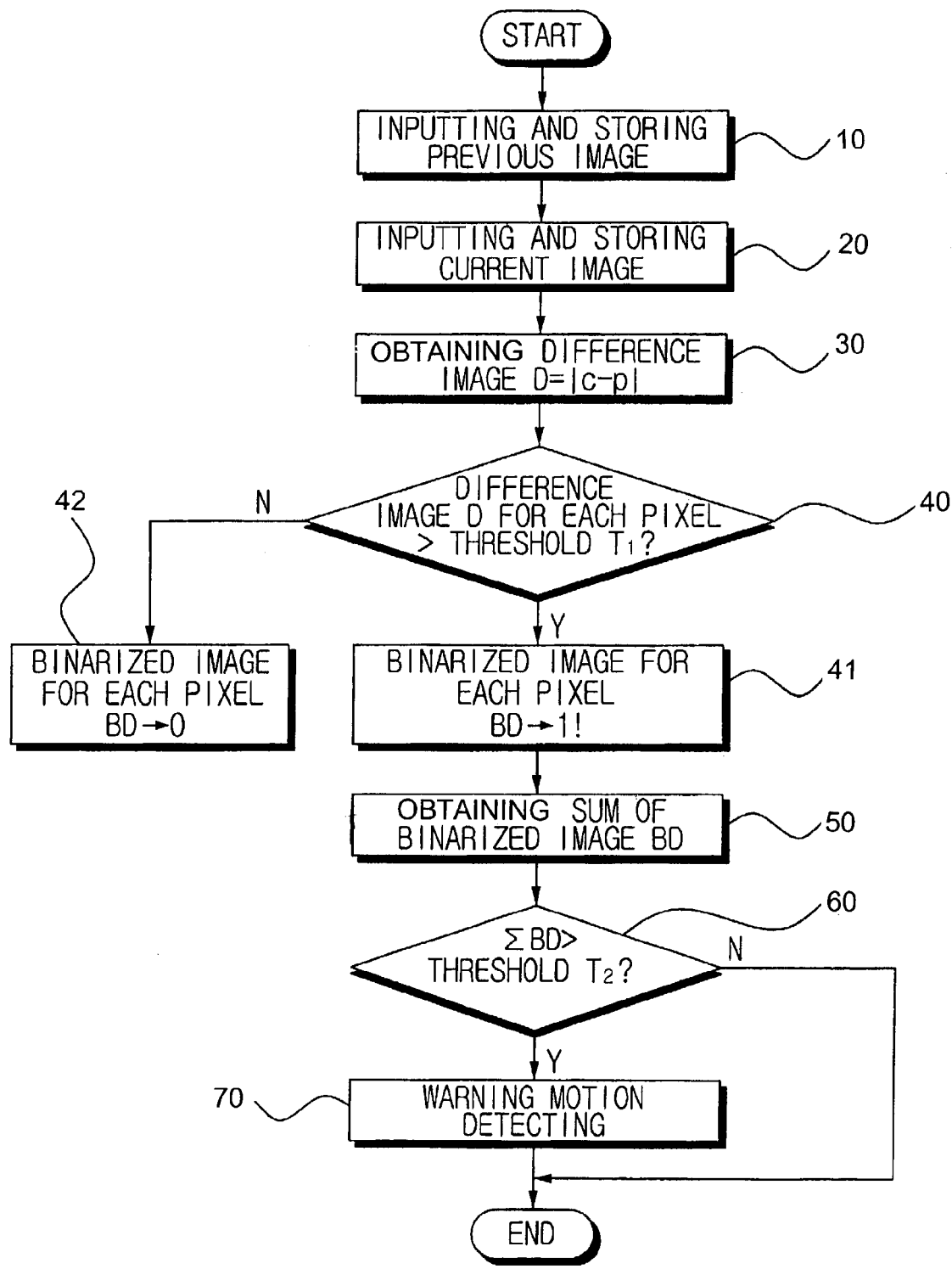
FIG. 2 is a flow chart of detecting motion in image data using the apparatus of FIG. 1.

Reference will now be made in detail to the present preferred embodiments, of the present invention, examples of which are illustrated in the accompanying drawings, wherein like reference numerals refer to the like elements throughout. The embodiments are described below to explain the present invention by referring to the figures.

Figure 3:
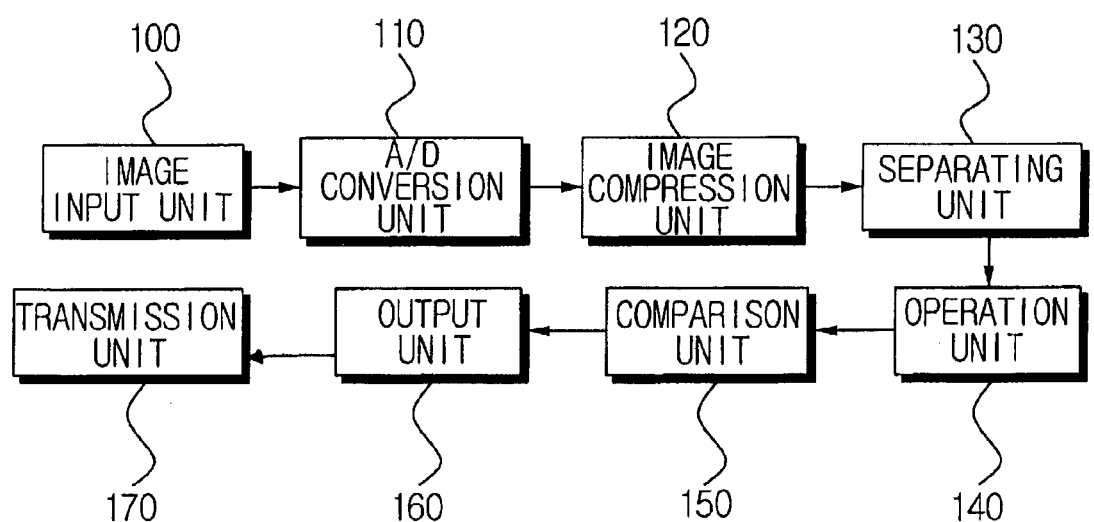
FIG. 3 is a block diagram of an image processing system using an apparatus detecting motion in image data, according to an embodiment of the present invention.

FIG. 3 is a block diagram of an image processing system using an apparatus detecting motion in an image according to an embodiment of the present invention. As shown in FIG. 3, the image processing system comprises an image input unit 100, an A/D conversion unit 110, an image compression unit 120, a separation unit 130, an operation unit 140, a comparison unit 150, an output unit 160 and a transmission unit 170.

The image input unit 100 is a device converting an image into a signal, such as a video camera. The image is output as an analog signal when the image input unit 100 is an analog apparatus, and the image is output as a digital signal when the image input unit 100 is a digital apparatus, such as a digital camera. When the image is output as the analog signal, the A/D conversion unit 110 outputs the image after converting the image into the digital signal.

The image compression unit 120 is a device encoding and compressing the digital image signal received from the A/D conversion unit 110. There are two kinds of bit streams output from the image compression unit 120, based on an encoding method as follows: a bit stream by encoding the received digital image signal in relation to a motion predicting mode; and a bit stream by encoding the received digital image signal in relation to a without-motion predicting mode. The motion predicting mode can an inter mode (i.e., based upon an inter-frame compression technique) that transmits/provides a difference between a motion compensated image and an original image after searching a motion vector between the motion compensated image frame and the original frame image. The without-motion predicting mode can be an intra mode (i.e., based upon an intra-frame compression technique) that transmits/provides the original image after performing a Discrete Cosine Transform (DCT) to only reduce spatial overlap.

The separation unit 130 separates the bit stream in relation to the inter mode image from among the encoded bit streams output by the image compression unit 120. In other words, the bit stream in relation to the inter mode image is passed to the operation unit 140, and the bit stream related to the intra mode image is not passed to the operation unit 140.

The operation unit 140 operates/obtains/calculates an average value of the inter mode image bit stream applied/received from the separation unit 130. The comparison unit 150 compares a signal corresponding to the average value input from the operation unit 140 with a signal corresponding to a threshold set up in advance, and when the signal corresponding to the average value is greater than the threshold, the comparison unit 150 detects a motion and sends a detecting signal to the output unit 160.

The output unit 160 judges that there is a movement (motion) when the detecting signal is transmitted from the comparison unit 150 to the output unit 160, and outputs a warning signal in relation/in response to the detected motion. For example, a warning sound can be generated, or a warning message in relation to the motion can be transmitted to a wireless terminal. Further, the transmission unit 170 can transmit the image data with the detected motion through a network in response to a warning signal (e.g., when a warning signal is transmitted from the output unit 160 to the transmission unit 170, etc.). Typically, the output unit 160 and the transmission unit 170 can be part of an existing network image monitoring system and interfaced with processing units 110 through 150, which are according to an embodiment of the present invention.

According to an aspect of the present invention, the capacity of the inter mode image bit stream becomes great when the image includes a motion. Therefore, the average value of the inter-mode image bit stream can be a substantially reliable predictor of motion in a frame image. More particularly, as the average value of the inter-mode image bit stream becomes greater, a motion can be predicted, and, thus, detected to reliably output a motion detecting signal. In FIG. 3, the processes of the present invention as embodied in units 100 through 150 can be implemented in software and/or computer hardware as part of a main processing unit of a network digital image monitoring system receiving video camera signal (e.g., a computer server). The main processing unit would output and/or transmit information (e.g., warning signals, images, etc.) to other components/devices of the network digital image monitoring system, in response to detected motions in images received from a camera monitoring an area.

Figure 4:
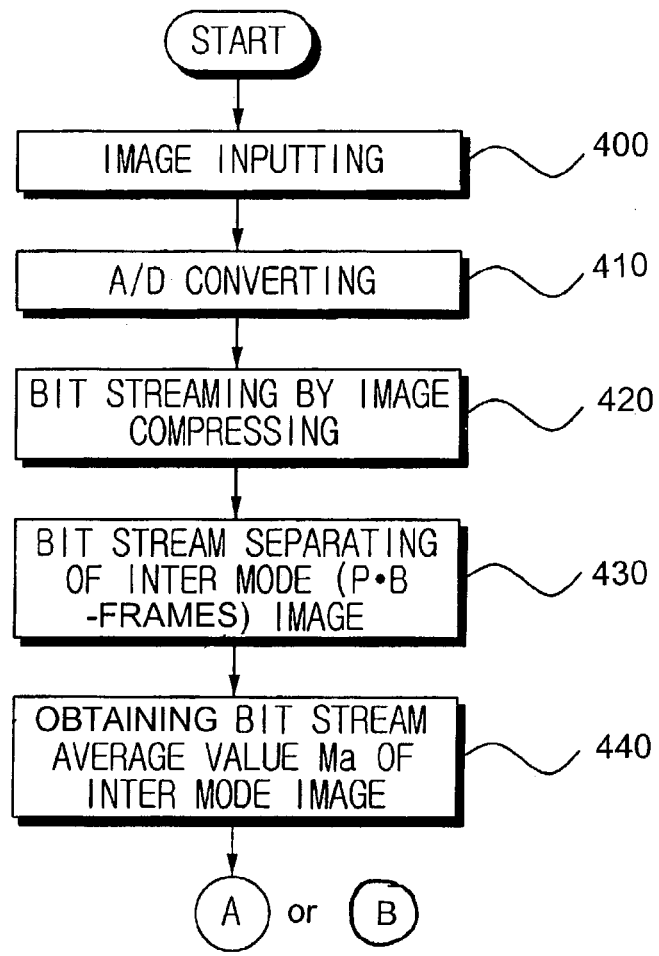
FIGS. 4, 5A and 5B are flow charts of detecting motion in image data using the system shown in FIG. 3.
Figure 5A:
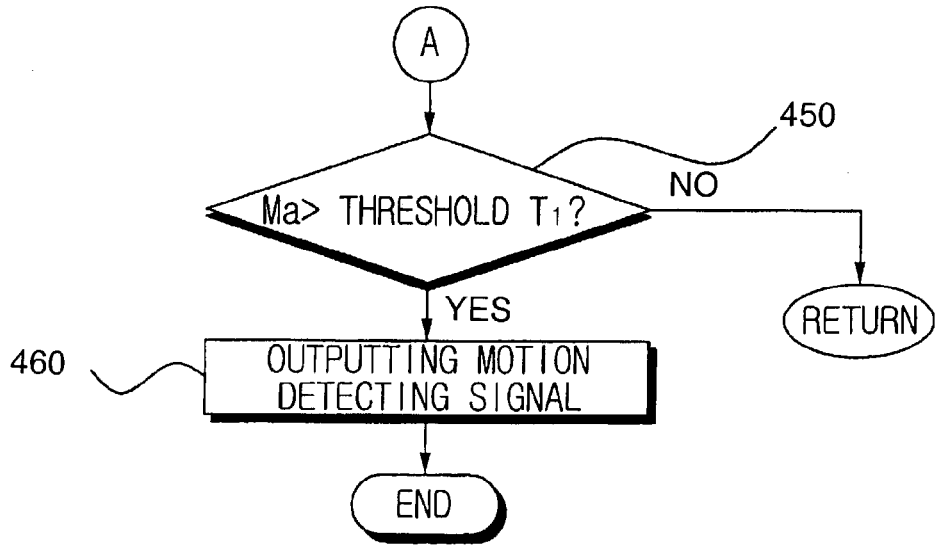

FIGS. 4 and 5A are flow charts of detecting motion in image data using the system shown in FIG. 3. At operations 400 and 410, when an the image is output as an analog signal from the image input unit 100, the A/D conversion unit 110 converts the analog signal into a digital signal. At operation 420, the digital signal is input into the image compression unit 120 and encoded according to an encoding method to output compressed bit streams. Typically, the image compression unit 120 uses an inter-frame and intra-frame compression/encoding method, such as the Moving Picture Experts Group (MPEG) encoding standard, that encodes the received digital image signal into an inter mode image bit stream and an intra mode image bit stream.

Using the MPEG encoding standard as an example, when the inter mode image bit stream and the intra mode image bit stream are output from the image compression unit 120 and input into the separation unit 130, at operation 430, the separation unit 130 separates the inter mode image bit stream (i.e., B- and P-frames) and the intra mode image bit stream by passing only the inter mode image bit stream to the operation unit 440. When only the inter mode image bit stream is passed at the separation unit 130 and transmitted into the operation unit 140, at operation 440, the operation unit 140 obtains an average value (Ma) of the inter mode image bit stream. The inter mode image bit stream is an image bit stream of a motion predicting mode (i.e., the inter mode image bit stream is used to predict a motion in a frame image), thus the average value is very small when there is little movement in a frame image sequence and the average value increases relative to movement in a frame image sequence.

When the average value of the inter mode image bit stream is obtained at the operation unit 140 and input into the comparison unit 150, at operation 450, the comparison unit 150 compares the average value with a set up threshold $T_1$. At operation 460, when the obtained average value is greater than the threshold $T_1$, a corresponding motion signal indicating motion detection is output. More particularly, at operation 450, when it is judged that the average value of the inter mode image bit stream is greater than the threshold $T_1$, at operation 460, the output unit 160 determines that a motion image is included in the received image sequence in response to the motion detection signal from the comparison unit 150 and outputs a warning signal in response to the motion detection. Further, the transmission unit 170 can transmit the image data with the detected motion through the network based on the warning signal. More particularly, at operation 460, the output unit 160 implemented as a control process (software) can control warning for motion detection, storing a corresponding image data, or transmission of a motion detection message to an electric mail, a PDA and/or a mobile phone.

Figure 5B:
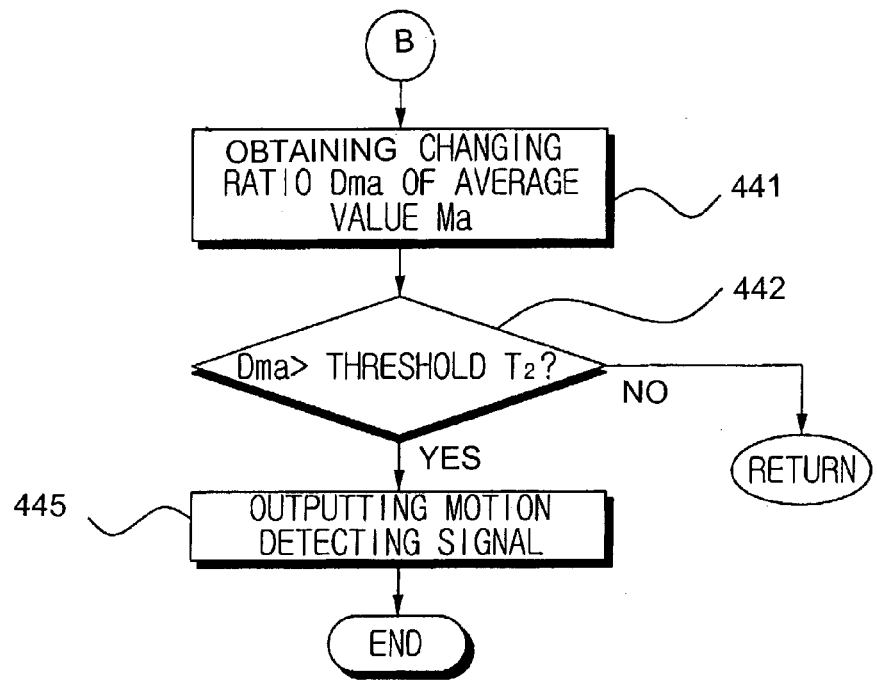

FIG. 5B is a flow chart of detecting motion in image data using the system shown in FIG. 3, according to another embodiment of the present invention. In FIG. 5B, at operation 440, the operation unit 140 obtains the average value (Ma) of the inter mode image bit stream, and after that, at operation 441, calculates a changing ratio (DMa) of the average value (Ma). At operation 442, the comparison unit 150 judges whether there is movement in a received frame image by comparing the obtained changing ratio (DMa) and a set up threshold $T_2$. More particularly, at operation 442, if the obtained changing ratio is greater than the threshold $T_2$, the comparison unit 150 determines detection of a motion in the received frame image and outputs a motion detection signal to the output unit 160. At operation 441, the changing ratio of the inter mode image bit stream is almost zero when there is little movement. Yet, when there is movement in the received image sequence, the changing ratio of the inter mode image bit stream is very large compared to the case that there is not movement. Thus, the threshold $T_2$ is set according to such observation of the changing ratio of the inter mode image bit stream in relation to movement in an image frame.

At operation 445, the output unit 160 determines that a motion image is included in the received image sequence in response to the motion detection signal from the comparison unit 150 and outputs a warning signal in response to the motion detection. In particular processes of operation 445 by the output unit 160 are similar to the processes of the output unit 160 at operation 460 in FIG. 5A.

Hereinbelow, motion detection in a video frame image in an automatic network image monitoring system according to the present invention will be described. The image input unit 100 can be one or more video/motion cameras installed in a watching area and in communication via a network with a main/central processing unit (not shown), such as a computer server. Typically, the processes of the present invention are implemented in the processing unit. Typically, the image input unit 100 transmits image data after processing/receiving the image data as an analog signal to the processing unit when a camera is an analog camera, and the image input unit 100 transmits the image data after processing the image as a digital signal when the camera is a digital camera. When the image data is input as the analog signal, the image data is converted into the digital signal at the A/D conversion unit 110. When the image input unit 100 comprises digital video cameras, the A/D conversion unit 110 does not have to be installed (i.e., the A/D conversion unit 110 may be omitted).

When the image signal is input, the automatic monitoring system network can, for example, transmit the image signal to other components/devices, such as a display monitor, and/or can compress the input image signal to be stored into a DVR (digital video recorder). When the input image signal is compressed, the image compression unit 120 encodes the image signal, typically according to an inter-frame and intra-frame compression technique, to compress the input image. The image compression unit 120 outputs a bit stream encoded in relation to a motion predicting mode (inter mode) and encoded in relation to a without-motion predicting mode (intra mode).

The bit streams output from the image compression unit 120 are transmitted to the separation unit 130. The separation unit 130 is set up to pass the inter mode bit stream only, thus the inter mode image bit stream and the intra mode bit stream are separated, and only the inter mode bit stream is transmitted to the operation unit 140. The operation unit 140 calculates the average value of the inter mode bit stream and transmits a signal corresponding to the average value to the comparison unit 150. The comparison unit 150 compares the input signal corresponding to the average value of the inter mode bit stream with a predetermined threshold. When the average value of the inter mode bit stream is greater than the threshold, it is judged that there is movement in the received frame image, and a corresponding motion signal is output. When the average value of the inter mode bit stream is less than the threshold, it is judged that there is no movement, thus motion detection continues. When there is no movement in the image sequence, the inter mode image bit stream has a very small average value, and when there is movement in the image sequence, the inter mode image bit stream has a very large value. Thus, a threshold can be easily determined and a motion in a frame image can be easily detected based upon size of the average value of the inter mode bit stream corresponding to a. Further, when a changing ratio of the average value is calculated and compared with a threshold, detection of a motion in a frame image can be improved.

When the corresponding motion signal is output from the comparison unit 150, it has been judged that there is movement in a frame image, and the signal is transmitted to the output unit 160 from the comparison unit 150. The output unit 160 can output a warning signal, in response to the received motion signal from the comparison unit 150. When the warning signal is output, the frame image with the detected motion is stored into the DVR, and various functions of transmitting electric mails to an owner, the police, or a security company, or other functions of transmitting an informative message regarding the detected motion, including the frame image with the motion, using sound, information or other methods, to the owner, the police or the security company may be performed through the transmission unit 170 and/or the output unit 160.

Figure 6A:
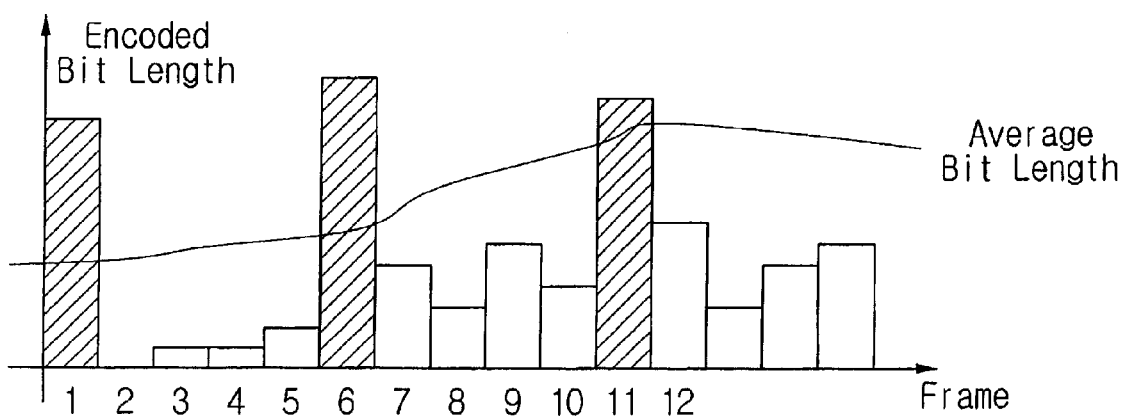
FIGS. 6A and 6B are graphs showing a bit length of an intra mode and an inter mode.
Figure 6B:
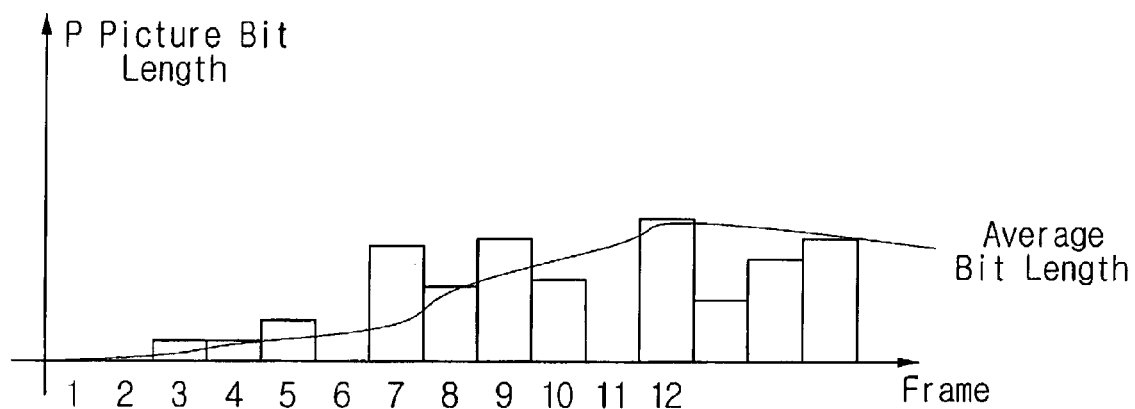
Figure 7A:
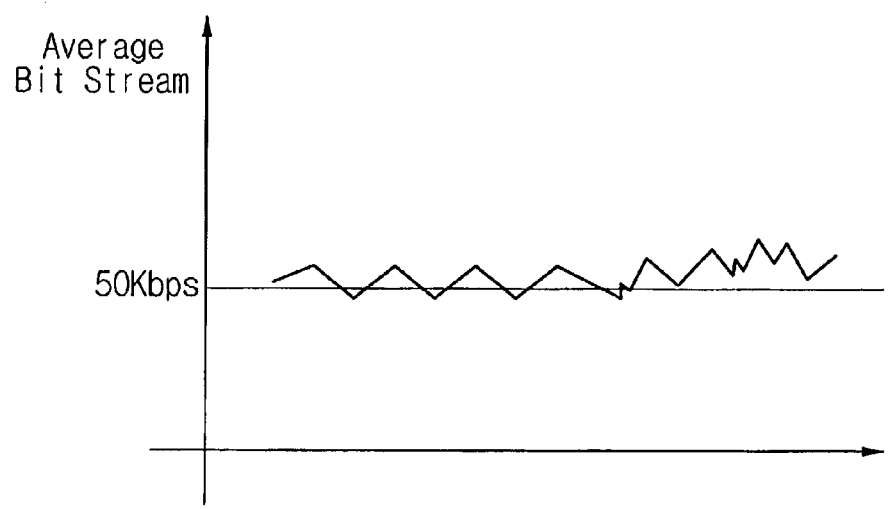
FIGS. 7A and 8A are graphs showing an average value of an entire bit stream.
Figure 7B:
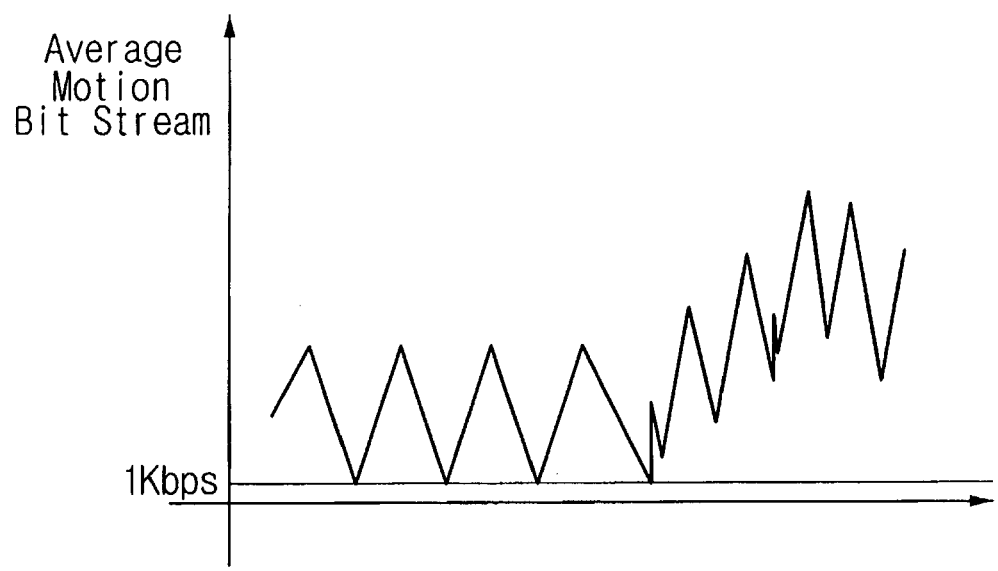
FIGS. 7B and 8B are graphs showing an average value of an image bit stream of an inter mode.
Figure 8A:
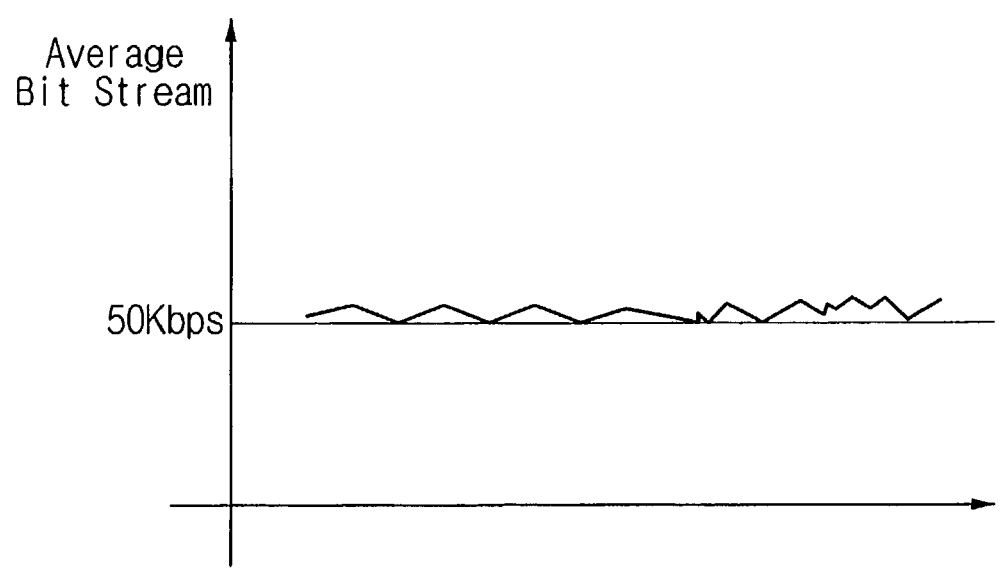
Figure 8B:
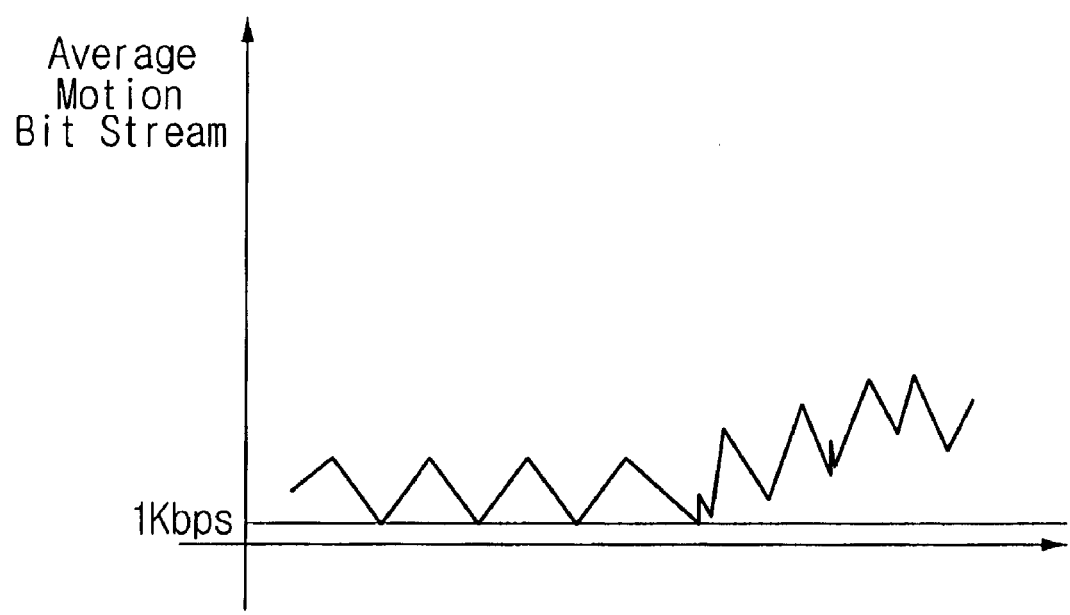

FIG. 6A is a graph showing a bit length of each frame of an encoded image bit stream using an inter-frame and intra-frame encoding technique. FIG. 6B is a graph showing only the bit lengths of the encoded inter mode frames (i.e., P picture bit length). FIGS. 7A and 7B are graphs showing an average bit stream value using an entire bit stream. FIGS. 8A and 8B are graphs showing the average bit stream value using the encoded inter mode image bit stream.

Frames 1, 6 and 11 in FIGS. 6A and 6B, are the bit lengths of intra mode frames (I-Frame), frames 3, 4, 5, 7, 8, 9, 10 and 12 are the bit lengths of inter mode frames (B-Frames, P-Frames), and the solid line is the average bit length. According to the graphs, a motion is included in the frame image 3. As shown in FIGS. 6A and 6B, the bit length of the intra mode frames is more than the average bit length, thus when a bit stream of the intra mode is included, it would be difficult to detect the motion, thus providing a rationale for separating the intra-mode frames from the inter-mode frames. Therefore, a motion can be easily detected depending upon changes in the bit stream size using the inter mode frames, which represent a difference between a motion compensated image and an original image after finding a motion vector between the motion compensated frame image and the original image frame.

As shown in FIG. 6B, when there is little motion in the image, the bit length of the inter mode frames is almost zero, such as the inter frame 2. However, when there is much motion in the image, the bit length of the inter mode frames is long in relation to the average bit length of an inter mode bit stream, such as inter frames 7, 8, 9, 10 and 12. Therefore, the motion can be easily and reliably detected if a bit length of an inter frame is longer than an average bit length of the inter mode bit stream.

Furthermore, FIGS. 7A, 7B, 8A and 8B are graphs showing the average value of an inter-mode image bit stream when using the entirely encoded bit stream and only the inter mode image bit stream. FIGS. 7A and 8A are graphs showing a 5 Kbps motion, and FIGS. 7B and 8B are graphs showing a 1 Kbps motion. As shown in FIGS. 7A and 8A, the average value of the entirely encoded bit stream includes the intra mode bit stream, thus a calculated difference tied to a motion is relatively small in relation to the average bit length of the inter mode bit stream. Even, if a threshold is set up high, the motion is hardly detectable, thus, supporting the rationale for excluding the intra mode image bit stream. However, as shown in FIGS. 7B and 8B, when only the inter mode bit stream is used, a deviation tied to a motion is great in relation to the average bit length of the inter mode bit stream, and, thus, the motion is easily and reliably detected even though a low/small threshold is set.

Accordingly, the apparatus detecting motions in frame images and the method thereof according the present invention can easily and reliably detect the motions by using an inter mode image bit stream after separating an intra mode image bit stream from the bit streams of the image. Advantageously, according to the present invention, the motion of the image can be detected by using an encoded bit stream already generated by compression processes in an image monitoring system, for example, for purpose of recording/archiving, without adding a separate circuitry or memory. More particularly, typically, only software processes utilizing the generated encoded bit streams are implemented in the image monitoring system. Further, motion detection can be more reliable by substantially reducing false motion detections because of an image signal noise.

Although the preferred embodiments of the present invention have been described, it will be understood by those skilled in the art that the present invention should not be limited to the described preferred embodiments, but various changes and modifications can be made within the spirit and the scope of the present invention, which is defined in the claims and their equivalents.

What is claimed is:

1. An apparatus detecting a motion in an image data, comprising:
a separation unit separating a bit stream in relation to a motion predicted image from a compressed image bit stream;
an operation unit calculating an average value of the bit stream in relation to the motion predicted image; and
a comparison unit comparing the calculated average value and a predetermined threshold to output a motion detecting signal when the average value is greater than the predetermined threshold.

2. The apparatus detecting a motion in an image data of claim 1, wherein the motion predicted image is an inter mode image.

3. The apparatus detecting a motion in an image data of claim 1, further comprising an output unit outputting a warning signal in response to the motion detecting signal from the comparison unit.

4. The apparatus detecting a motion in an image data of claim 1, further comprising a transmission unit transmitting the image data with the detected motion in response to the motion detecting signal.

5. An apparatus detecting a motion in an image data, comprising:
a separation unit separating a bit stream in relation to a motion predicted image from a compressed image bit stream;
an operation unit calculating an average value in relation to the motion predicted image and a changing ratio of the average value; and
a comparison unit comparing the changing ratio of the average value and a predetermined threshold to output a motion detecting signal when the changing ratio is greater than the threshold.

6. The apparatus of detecting a motion in an image data of claim 5, wherein the motion predicted image is an inter mode image.

7. The apparatus of detecting a motion in an image data of claim 5, further comprising an output unit outputting a warning signal in response to the motion detecting signal from the comparison unit.

8. The apparatus of detecting a motion in an image data of claim 5, further comprising a transmission unit transmitting the image data with the detected in response to the motion detecting signal.

9. A method of detecting a motion in an image data, comprising:
   separating a bit stream of a motion predicted image from a compressed bit stream;
   calculating an average value of the bit stream of the motion predicted image; and
   detecting the motion in the image data when the average value is greater than a predetermined threshold after comparing the average value and the threshold.

10. The method of detecting a motion in an image data of claim 9, further comprising outputting a motion detecting signal in response to a detected motion.

11. The method of detecting a motion in an image data of claim 10, further comprising transmitting the image data with the detected motion in response to the motion detecting signal.

12. A method of detecting a motion in an image data, comprising:
   separating a bit stream of a motion predicted image from a compressed bit stream;
   calculating a changing ratio of an average value of the bit stream of the motion predicted image; and
   detecting the motion of the image data when the changing ratio is greater than a predetermined threshold after comparing the changing ratio and the threshold.

13. The method of detecting a motion in an image data of claim 12, further comprising outputting a motion detecting signal in response to a detected motion.

14. The method of detecting a motion in an image data of claim 13, further comprising transmitting an image data with the detected motion in response to the motion detecting signal.

15. A network image monitoring system compressing image signals and detecting a motion in a frame image, comprising:
   an image input unit transmitting the image signals; and
   a programmed computer processor generating a compressed bit stream, separating a bit stream of a motion predicted image from the compressed bit stream, calculating an average value of the bit stream of the motion predicted image, and detecting a motion in the frame image based upon the calculated average value.

* * * * *